United States Patent [19]

Josefowicz

[11] Patent Number: 5,451,476
[45] Date of Patent: Sep. 19, 1995

[54] CATHODE FOR A SOLID-STATE BATTERY

[75] Inventor: Jack Y. Josefowicz, Philadelphia, Pa.

[73] Assignee: The Trustees of the University of Pennsylvania, Philadelphia, Pa.

[21] Appl. No.: 980,593

[22] Filed: Nov. 23, 1992

[51] Int. Cl.$^6$ ............................................. H01M 4/64
[52] U.S. Cl. ................................... 429/213; 429/235
[58] Field of Search ............................... 429/213, 235

[56] References Cited

U.S. PATENT DOCUMENTS

| 4,728,589 | 3/1988 | MacDiarmrd et al. | 429/212 |
| 4,939,050 | 7/1990 | Toyosawa et al. | 429/241 |
| 5,080,963 | 1/1992 | Tatarchuk et al. | 429/235 X |

FOREIGN PATENT DOCUMENTS

| 3838575A1 | 5/1989 | Germany . |
| 4010369A1 | 10/1990 | Germany . |
| 60-221964 | 11/1985 | Japan . |
| 63-55868 | 3/1988 | Japan . |
| 63-136476 | 6/1988 | Japan . |
| 63-301462 | 12/1988 | Japan . |
| 63-301465 | 12/1988 | Japan . |
| 1-107467 | 4/1989 | Japan . |
| 1-150536 | 6/1989 | Japan . |
| 1-217855 | 8/1989 | Japan . |
| 1-231261 | 9/1989 | Japan . |
| 1-243382 | 9/1989 | Japan . |
| 2-174076 | 7/1990 | Japan . |
| 2-236971 | 9/1990 | Japan . |
| 2-236972 | 9/1990 | Japan . |
| 2-239572 | 9/1990 | Japan . |
| 02236972 | 9/1990 | Japan . |
| 3-171567 | 7/1991 | Japan . |
| 2239572 | 9/1991 | Japan . |

OTHER PUBLICATIONS

Senzaki et al., *Chemical Abstracts*, Issue 26, 115:283543h (1991).
Yang et al., *Chemical Abstracts*, Issue 18, 114:167789y (1991).
Yang et al., *Chemical Abstracts*, Issue 26, 113:234565s (1990).
Osaka et al., *Chemical Abstracts*, Issue 24, 112:220307b.
Genies et al., *Chemical Abstracts*, Issue 18, 110:157626w.
Genies et al., *Chemical Abstracts*, Issue 20, 106:159509b.
Syed et al., *Chemical Abstracts*, Issue 2, 106:7506k (1986).
Ohsaka et al., *J. Electroanal. Chem.*, 161, pp. 399–405 (1984).
Kobayashi et al., *J. Electroanal. Chem.*, 161, pp. 419–423.
Green and Woodhead, *J. Chem. Soc.*, pp. 2388–2403 (1910).
Saito, K. et al., "Absorption Characteristics and Applications of PAN-Based Activated Carbon Fiber.".

Primary Examiner—Prince Willis, Jr.
Assistant Examiner—M. Nuzzolillo
Attorney, Agent, or Firm—Duane, Morris & Heckscher

[57] ABSTRACT

Cathode for collecting and donating charged particles. The cathode comprises current collector means for collecting charged particles injected into the cathode from an anode. Current conducting means are provided which are electrically interfaced to an ion transporting medium and to the current collector means. The current conductor means transfers charge from the current collector means to the ion transporting medium. The current conducting means comprises a plurality of core members and a charge donor material that donates charge to the ion transporting medium when the current collector means collects charged particles. A battery is also provided comprising the cathode and an anode means for discharging charged particles when the battery is loaded. Methods of manufacturing the cathode comprise coating a plurality of core members with a charge donating material and interfacing the coated core members to an ion transporting medium to provide a subassembly composite. The subassembly composite is interfaced with the current collector. In preferred embodiments, the cathode comprises a matrix of carbon fibers coated with an electrically conductive polymer which are integrally engaged with a polymeric ion transporting medium.

30 Claims, 3 Drawing Sheets

CATHODE FOR A SOLID-STATE BATTERY

FIELD OF THE INVENTION

The present invention relates to a cathode. More particularly, the present invention relates to a cathode for a battery wherein the cathode contains core members to effect charge transfer.

BACKGROUND OF THE INVENTION

Batteries are used extensively in modern electronic devices, including radios, portable communications devices, such as cellular telephones, laptop computers, camcorders and the like. The term "battery" is used herein to refer generally to any device which converts chemical energy into electrical energy. Batteries are also generally used as secondary power sources in electronic devices to provide power in the event that the primary power source, for example, electric power produced by a generator, fails. The failure of primary power sources is potentially life-threatening in connection with life-sustaining electronic devices, for example, medical devices, including life-support systems. Thus, secondary power sources, including batteries, which discharge power in a reliable fashion and which have significant cycle and shelf lives are particularly important in the operation of modern electronic devices.

The term "cycle life" is used herein to refer to the number of cycles that a battery can undergo at a specified rate of discharge without significant deterioration in performance. The term "shelf life" is used herein to refer to retention of operational capabilities during storage in a charged configuration.

As known to those skilled in the art, batteries generally comprise a positive electrode (cathode) and a negative electrode (anode) which are typically separated by an intervening electrolyte. When the battery is loaded (i.e., when an external circuit from the anode to the cathode is completed), the battery is discharged and chemical energy in the battery is converted into electrical energy. The chemical reactions which are involved in the discharge of batteries include oxidation reactions which occur at the anode and reduction reactions which occur at the cathode. Accordingly, the anode typically comprises materials which are readily oxidized, for example, metals, such as lead and zinc, and the cathode typically comprises materials which are readily reduced, for example, metal oxides, such as lead oxide.

Electrically conducting polymers, for example, polyanilines, polythiophenes, and polypyrroles, offer potential advantages over conventional battery materials, including high gravimetric energy densities for maximum energy storage, high gravimetric power densities for rapid access to the stored energy, high conductivities for efficient current collection, large surface area for efficient materials utilization and high reaction rates, and low cost. In addition, the facile processability of polymers presents an improvement over traditional high-temperature metallurgical processing, and the lightweight characteristics of plastics derived from polymers generally satisfies low weight requirements associated with portable electronic devices, for example, radios, and vehicular devices, such as electrically-powered automobiles.

Interest in the application of electrically conducting polymers in batteries has been reported in the literature. See, e.g., U.S. Pat. No. 4,939,050; Japanese Patent Nos. 02239572 and 63301465; and German Patent DE 4010369. The disclosed batteries generally comprise electrically conducting polymers which have been doped with dopants, including charge-transfer agents, for example, electron donors and/or electron acceptors, such as inorganic compounds, including arsenic pentafluoride ($AsF_5$), to increase the conductivities of the polymers. In addition, various of the batteries disclosed in these publications are solid state lithium batteries which comprise composites of doped polyaniline and carbon as the cathode. The polyaniline-carbon composite cathode may be prepared by mixing carbon, for example, carbon black, with polyaniline and pressing the mixture into a pellet.

Alternatively, the polyaniline-carbon composite cathodes may be prepared by depositing polyaniline directly on the surface of the carbon to provide polyaniline-carbon composite which is then pressed into pellets. The polyaniline-carbon composites which are pressed into pellets are referred to generally as "pelletized" polyaniline-carbon composites. The foregoing Japanese and German patents disclose further that a polymeric electrolyte, such as polyethylene, is disposed between the cathode and a compatible anode. The prior art batteries which comprise such pelletized polyaniline-carbon composites and polymeric electrolytes are depicted schematically in FIG. 1.

Figure 1:
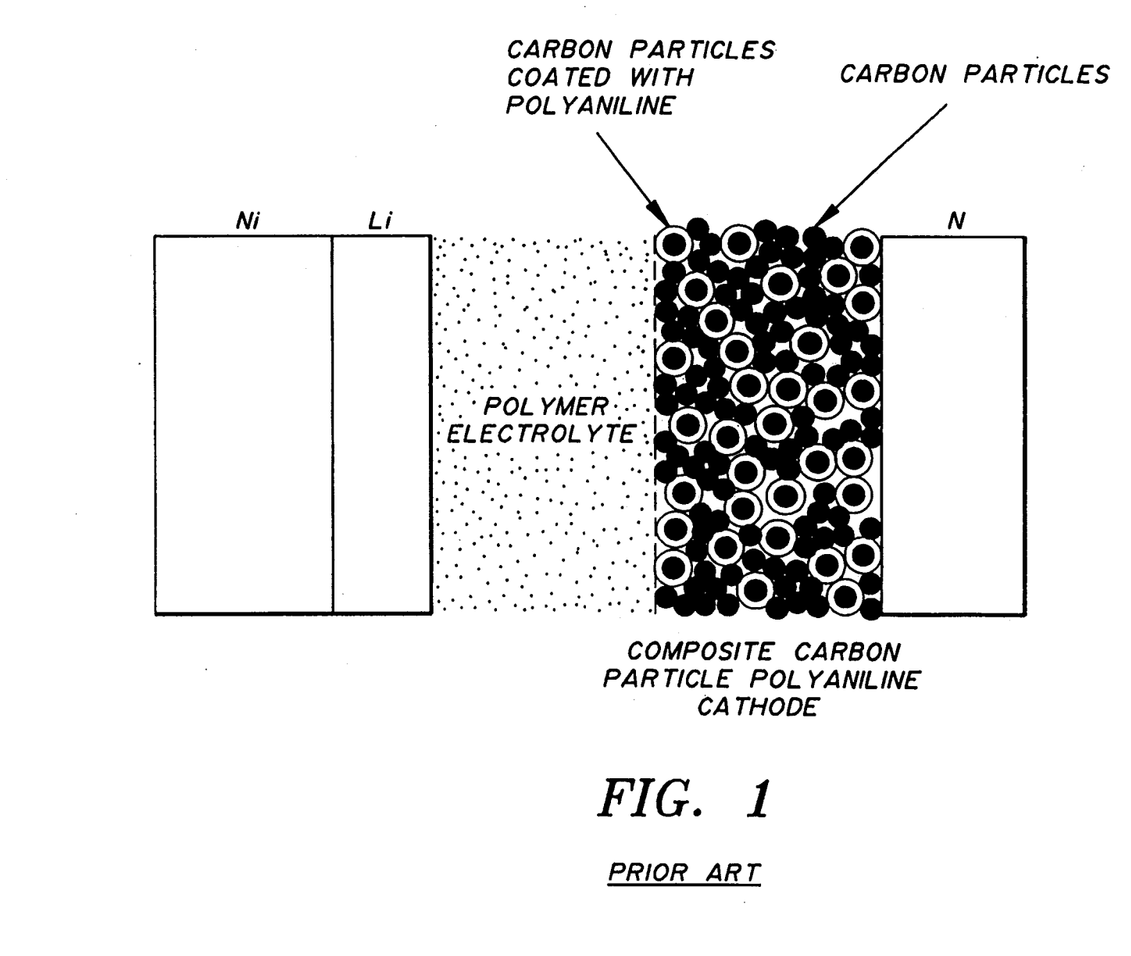
FIG. 1 is a schematic representation of a battery according to the prior art.

Batteries which comprise electrically conducting polymers, including the batteries disclosed in the foregoing Japanese and German patents and which are depicted schematically in prior art FIG. 1, suffer from various drawbacks. In this connection, prior art batteries generally possess limited cycle and shelf lives which are due to flaws inherent to the design of such batteries. These design flaws are described in detail below.

In the prior art batteries which comprise electrically conducting polymers, including those depicted in FIG. 1, electronic charge is transferred generally from the cathode to the conducting polymer in the interior of the cathode by a perculation pathway. The perculation pathway corresponds to polymer-coated carbon particles, carbon particles or a combination thereof. As the battery is discharged, the dopant gradually leaches out from the polymer, resulting in a substantial increase in the resistivity of the polymer. Eventually, the polymer behaves as an insulating material. Electronic charge must then be transferred via the carbon particles, which are generally spatially isolated from each other, and from the current collector. This results in a low or reduced utilization efficiency for cathodes which comprise pelletized polymer-carbon composites and the battery as a whole.

Attempts to overcome the reduced efficiencies of prior art cathodes and batteries which comprise pelletized polymer-carbon composites have generally been unsatisfactory. These attempts have included increasing the concentration of carbon particles which are not coated with electrically conductive polymer to provide alternative perculation pathways. However, this results in an increase of the non-active mass in the cathode, thereby decreasing the energy density of the battery.

In addition to batteries which comprise pelletized polymer-carbon composites, there is disclosed in the prior art batteries which comprise a network of stainless steel wires onto which is deposited doped polyaniline to form a composite cathode. See, e.g., U.S. Pat. No. 4,939,050. However, this arrangement is also fraught with disadvantages. For example, the surface area of the steel wire arrangement is relatively low, owing to the generally high diameters of the steel wires (35 to 120 microns). Only a limited amount of the polyaniline may therefore be deposited on the steel wire arrangement, resulting in a low or reduced utilization efficiency for cathodes and batteries which comprise such steel wire/polymer composites. Moreover, the stability of steel is limited and is prone to rusting, oxidation, and the like, resulting in cathodes and batteries which have limited shelf lives.

Thus, prior art batteries and cathodes which comprise electrically conductive polymers suffer from several drawbacks, including limited cycle and shelf lives. Moreover, the prior art batteries and cathodes generally comprise electrically conductive polymers which tend to become highly resistive, thereby reducing the utilization efficiency of the batteries and cathodes.

SUMMARY OF THE INVENTION

One aspect of the present invention relates to a cathode comprising current collector means for collecting charged particles injected into the cathode from an anode. Current conducting means are electrically interfaced to the current collector means and an ion transporting medium. The current conducting means provides means for transferring charge from the current collector means to the ion transporting medium. The current conducting means further comprises a plurality of core members and charge donor material that donates charge to the ion transporting medium when the charged particles are collected by the collector means.

In preferred embodiments, the present invention relates to a battery comprising anode means for discharging a first species of charged particles when the battery is loaded and which is electrically interfaced with charged particle receiving means. The charged particle receiving means receives a second species of charged particles from the anode means. A current collector means is provided and is electrically interfaced to the charged particle receiving means. The current collector means receives the first species of charged particles from the anode means when the battery is loaded. The battery further comprises core member means which electrically interface with the current collector means and which extends into the charged particle receiving means for transferring charge from the current collector means to the charged particle receiving means. Charge donor means which electrically interface with the core member means donates a third species of charged particles to the charged particle receiving means when the battery is loaded.

Yet another preferred embodiment of the invention relates to a method of manufacturing a cathode to be used in a battery comprising the steps of coating a plurality of core members with a charge donating material, interfacing the plurality of coated core members to an ion transporting medium to provide a subassembly composite, and interfacing the subassembly composite to a current collector.

Preferred embodiments of methods and apparatus taught and claimed herein provide cathodes which efficiently collect and transfer electrical energy. The collection and transfer of electrical energy involves collecting charged particles from an anode by a cathode having current collector means. Current conducting means is provided which comprises a plurality of core members which are coated with a charge donating material. The coated core members are electrically interfaced to an ion transporting medium and to the current collecting means. As the current collector means collects charged particles, charge is donated from the charge donor material of the current conducting means to the ion transporting medium. The core members are preferably also of low resistance, and are capable of transferring charge from the current collector means to the ion transporting medium along the continuous core member path.

Preferred embodiments of methods and apparatus taught and claimed herein provide batteries for the convenient and efficient conversion of chemical energy into electrical energy. The batteries comprise a cathode, as described above, and an anode means for discharging a first species of charged particles when the battery is loaded. The anode means is electrically interfaced with charged particle receiving means and the current collector means of the cathode.

Preferred embodiments of methods and apparatus taught and claimed herein provide cathodes and batteries which are substantially lightweight and thus find application as primary and/or secondary power sources in microelectronic devices, for example, pacemakers and hearing aids, portable electronic devices, for example, radios, portable communications devices, such as cellular telephones, computers, including laptop computers, video recording devices, including camcorders, and electrically-powered vehicles, including electrically-powered automobiles. The cathodes and batteries of the present invention possess improved cycle and shelf lives and thus overcome the drawbacks associated with prior art batteries and cathodes which comprise conducting polymers.

BRIEF DESCRIPTION OF THE DRAWINGS

For the purpose of illustrating the invention, there are shown in the drawings forms which are presently preferred; it being understood, however, that this invention is not limited to the precise arrangement and instrumentality shown.

DETAILED DESCRIPTION OF PREFERRED EMBODIMENTS

Figure 2:
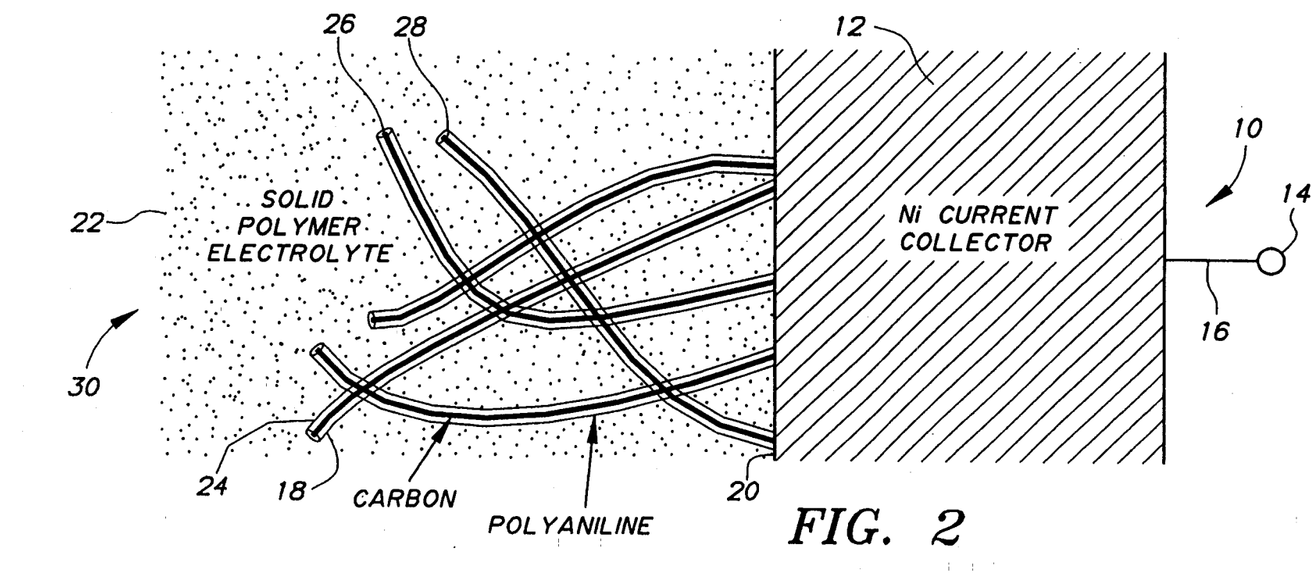
FIG. 2 is a cross-section of a cathode schematically showing a carbon fiber-polymer composite according to one embodiment of the present invention.

Referring to the drawings, wherein like numerals refer to like elements throughout the several views, FIG. 2 is a schematic representation of a cross-sectional view of a cathode 10. The cathode 10 includes current collector means 12 for collecting electrical current in the form of charged particles, for example, negatively charged particles, such as electrons. The current collector means 12 preferably comprises a material which can readily collect electrical current in the form of charged particles. Preferred materials for the current collector means 12 include transition metal elements, for example, nickel, iron and zinc, with nickel or nickel alloys being more preferred.

An outside source of current, represented schematically as outside current source 14, supplies electrical current in the form of charged particles which are injected into the current collector means 12 via current transmission means 16. The outside current source 14 comprises any suitable source of electrical current, including batteries, anodes and the like. Preferably, the outside current source 14 comprises an anode. The current transmission means 16 comprises any material which is substantially electrically conductive and which readily supplies electrical current to the current collector means 12. Suitable materials for the electrical transmission means 16 include metal wire and metal contacts and the electrically conductive polymers of the present invention.

Figure 3:
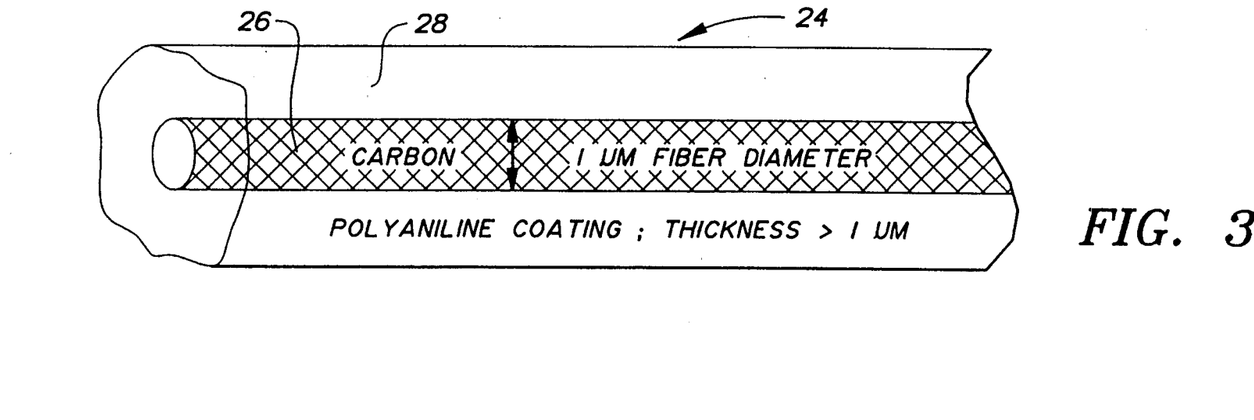
FIG. 3 is an enlarged, schematic representation of the carbon fiber-polymer composites depicted in FIG. 2 and which is illustrative of one embodiment of the present invention.

In accordance with preferred embodiments of the present invention, the cathode 10 further includes current conducting means 18. The current conducting means 18 is preferably electrically interfaced to a face 20 of the current collector means 12 and an ion transporting medium 22. With particular reference to FIGS. 2 and 3, there is provided herewith a detailed description of the current conducting means 18.

In accordance with preferred embodiments of the present invention, the current conducting means 18 comprises a plurality of current conducting members 24, each of which is electrically interfaced with the current collector means 12 and which extend into the ion transporting medium 22. Preferably, the current conducting members 24 are disposed substantially completely contiguously on the face 20 of the collector means 12.

Applicant has unexpectedly found that the core member 26 provides a continuous pathway for charge to be transferred. Accordingly, a low internal cathode resistance is maintained by core members 26 through various charging and discharging cycles of the cathode 10.

In accordance with preferred embodiments of the present invention, the conducting members 24 are disposed on the face 20 such that about one-half of the surface area of the face 20 is electrically interfaced with the conducting members 24.

The current conducting members 24 preferably comprise a material which is capable of transferring charge from the current collecting means 12 to the ion transporting medium 22 and which may be fashioned into "fingers" or "tentacles," as depicted schematically in FIG. 2. Examples of suitable materials from which the current conducting members 24 may be fashioned include wire, fibrous materials, for example, carbon fibers, including low-resistance carbon fibers, electrically conducting polymers, such as polyanilines and polythiophenes, and the like.

In accordance with preferred embodiments of the present invention, the current conducting members 24 preferably comprise a core member 26 which is substantially completely coated with a charge donor material 28. The core member 26 preferably comprises a material which is characterized by various desirable properties, including flexibility, electrical conductivity, chemical inertness, refractoriness and high strength, and whose surface readily adheres to the charge donor material 28.

The core member 26 also preferably has a substantially low diameter, for example, about 1 micron up to about 15 microns. The substantially low diameter enables a relatively large number of the current conducting members 24 to be electrically interfaced with the current collector means 12 and the ion transporting medium 22, thereby improving the charge-donor and charge-transfer efficiencies of the cathode 10. For core members which have a diameter of about 1 micron, about $5 \times 10^7$ of the core members 26 may be interfaced per square centimeter of the current collector means 12 and the ion transporting medium 22. For core members having a diameter of about 6 microns, about $2 \times 10^6$ of the core members 26 may be interfaced per square centimeter of the current collector means 12 and the ion transporting medium 22.

In accordance with certain embodiments of the invention, the core members 26 are substantially completely solid along their entire length. However, it is contemplated that in certain preferred embodiments, the core members 26 may comprise pores, for example, micro-pores. Pores impart beneficial and desirable characteristics to the core members 26, including increased surface area.

The core members 26 may comprise pores of various shapes and sizes. Preferably, the core members 26 comprise pores which have diameters of from about 1 angstrom up to about 10,000 angstroms.

Applicant has found that carbonaceous materials, for example, carbon fibers, are particularly suitable for use as the core member 26. Carbon fibers are filamentary forms of carbon, and generally possess carbon contents exceeding 92% by weight. Preferably, the core member 26 comprises a carbon fiber which is substantially solid or porous, and which is produced from a polyacrylonitrile (PAN) precursor. Porous carbon fibers, including porous carbon fibers produced from PAN, possess various desirable properties, including increased surface area, increased fiber diameters, which render the fibers easier to handle, and processing advantages. In addition, porous carbon fibers which have increased fiber diameters are generally manufactured at a lower cost.

Examples of carbon fibers which are particularly suitable for use in the methods and apparatus of the present invention include the various carbon fiber products which are commercially available from BASF Structural Materials, Inc. of Charlotte, N.C. These carbon fiber products include CELION ® G30-400; CELION ® G30-500; CELION ® G40-600; CELION ® G40-800; and CELION ® G50-300.

Other suitable materials to be used as the core member 26, in addition to those discussed above, will be readily apparent to one of ordinary skill in the art in view of the present disclosure.

As noted above, the current conducting means 18 of the present invention preferably comprises charge donor material 28 which preferably substantially completely covers the core member 26. The charge donor material 28 is any material that is capable of donating charge, for example, negatively charged particles, such as anions, including anionic radicals of acids, for example, perchlorate radicals ($ClO_4^-$), to the ion transporting medium 22 when charged particles are collected by the current collector means 12.

In accordance with preferred aspects of the present invention, applicants have found that electrically conductive polymers are particularly suitable for use as the charge donor material 28. The terms "electrically conductive" and "electrically conducting" are used herein in connection with polymers to refer to any polymer which is capable of conducting electricity. Preferred electrically conducting polymers are those polymers having extended $\pi$-electron conjugated backbones. This extended conjugation imparts highly desirable properties to the polymers, including low ionization potential and high electron affinities.

In accordance with preferred embodiments of the present invention, the electrically conductive polymers comprise repeating monomeric units having conjugated π-electron systems. Preferred monomeric units include aromatic ring systems, for example, aniline, phenol, thiophenol and phenyl, and heterocyclic ring systems, for example, thiophene, pyrrole and furan. The monomers are polymerized to provide copolymers, using techniques and methods which are well known to those skilled in the art, including, for example, chemical oxidation reactions and electrochemical reactions. The monomers may be polymerized alone or in combination with other monomers to provide copolymers, for example, copolymers of aniline and pyrrole. Examplary chemical reactions for preparing the polymers of the present invention include Ziegler-Natta, Friedel-Crafts and nucleophilic displacement reactions, Diels-Alder elimination, and Wittig and electrochemical coupling.

For illustration only, and not by way of limitation, the oxidative polymerization of phenyl-containing monomers to provide phenyl-containing polymers, including polyaniline, poly(p-phenylene oxide), poly(p-phenylene sulfide) and poly(p-phenylene), may be depicted by the following reaction scheme:

where X is NH, O, S or a chemical bond.

Methods for preparing electrically conductive polymers are described, for example, in U.S. Pat. No. 4,939,050, Toyosawa et al. and JANE E. FROMMER & RONALD R. CHANCE, HIGH PERFORMANCE POLYMERS AND COMPOSITES, pp. 174–219 (J. I. Kroschwitz ed. 1991) which are incorporated herein by reference.

Applicants have found that polyanilines are preferred electrically conductive polymers for use as the charge donor material 28. Polyanilines are electroactive organic polymers which are well-known to those skilled in the art and which display good environmental stability. Polyanilines can be prepared in a number of ways, including electrochemical techniques and by using different solvent/acid media. See, e.g., T. Ohsaka et al., *J. Electroanal. Chem.*, Vol. 161, p. 394 (1984) and T. Kobayashi, *J. Electroanal. Chem.*, Vol. 161, p. 419 (1984). Polyanilines possess varying structures and properties, depending on the specific method selected for their preparation.

In this connection, polyaniline may be prepared by precipitation from an aqueous solution containing various reagents, including ammonium persulfate, hydrochloric or sulfuric acid, and aniline. See, e.g., A. G. Green and A. E. Woodhead, *J. Chem. Soc.*, p. 2388 (1910) and M. Jozefowicz et al., *J. Poly. Sci.*, Part C, Vol. 15, p. 2943 (1967). The structure of the polymer backbone depends on the pH of the solution, among other variables. Consequently, a scheme of structures and corresponding names has been devised to describe the protonated, unprotonated, oxidized and reduced forms of polyaniline, some of which are shown below.

The polyaniline polymers depicted above are all polymerized through the aniline amino group. However, it is contemplated that all of the various forms of polyaniline, including polyaniline which is polymerized through the aniline phenyl group and polyanilines having substituted amino groups and which are capable of donating charge, are suitable for use as the charge donor material 28 in the methods and apparatus of the present invention.

The preparation of electrically conductive polymers, including the oxidative and/or electrochemical polymerization of monomers, is conducted generally in the presence of one or more oxidants and/or electrolytes. The oxidants and/or electrolytes suitable for use in the preparation of electrically conductive polymers of the present invention are those materials typically used in oxidative and/or electrochemical polymerization reactions. The oxidants and electrolytes generally include organic and inorganic salts or acids. Examples of suitable oxidants and/or electrolytes include tetraalkylammonium, lithium or silver salts or free acids of tetrafluoroborate, hexafluoroarsenate, hexafluorophosphate, perchlorate, fluorosulfonate, hydrogen sulfate, trifluoromethylsulfonate, trifluoroacetate, halide, including chloride, bromide, fluoride and iodide, phosphorate and dichromate or mixtures of two or more of these.

In accordance with preferred embodiments of the present invention, the electrolyte and/or oxidant comprises the lithium salt or free acid of dichromate, tetrafluoroborate, perchlorate, chloride, hexafluorophosphate, trifluoromethylsulfonate and hexafluoroarsenate or mixtures of two or more of these. Preferably, the oxidant and/or electrolyte comprises the lithium salt or free acid of tetrafluroborate, dichromate and perchlorate, with perchlorate being more preferred.

Other suitable oxidants and electrolytes, in addition to those exemplified above, would be readily apparent to one of ordinary skill in the art in view of the present disclosure.

The solvents suitable for use in the preparation of the electrically conductive polymers of the present invention include those solvents typically used in polymerization reactions, including oxidative and/or electrochemical polymerization reactions. Examples of suitable solvents include water, acetonitrile, ethylene glycol, methylene chloride, ethylene chloride, butanone, propylene carbonate, dimethylformamide, dimethylsulfoxide, diethylsulfoxide, ethanol, methanol, hexamethylphosphoramide, nitrobenzene, tetrahydrofuran, and low molecular weight polymers, for example, poly(ethylene glycol), and mixtures of two or more of the above solvents. A mixture of propylene carbonate and water is preferred.

Other suitable solvents, in addition to those exemplified above, would be readily apparent to one of ordinary skill in the art in view of the present disclosure.

Applicant has found that the electrically conducting polymers are preferably doped with one or more dopants. Preferred dopants are charge-transfer agents, for example, electron donors and electron acceptors, including organic and inorganic acids and the various salts thereof. The dopants impart highly desirable properties to the electrically conducting polymers of the present invention, including high concentrations of charge sources, for example, anionic charges, including anionic radicals of acids, such as perchlorate radicals ($ClO_4^-$), which the charge donor material 28 can donate to the ion transporting medium 22.

Doping conjugated organic polymers to improve significantly their electrical conductivity levels is known in the art and is described, for example, in JANE E. FROMMER & RONALD R. CHANCE, HIGH PERFORMANCE POLYMERS AND COMPOSITES, pp. 174–219 (1991). Examples of suitable dopants include the anionic counterions of the oxidants and/or electrolytes discussed hereinbefore in connection with the oxidative and electrochemical polymerization reactions to prepare the present electrically conductive polymers, as well as additional charge-transfer agents.

Doping of polymers may be accomplished by various chemical methods, including direct exposure of the polymer to a charge-transfer agent in the gas or solution phase, or by oxidation or reduction. Applicant has found that the electrically conductive polymers are conveniently doped with one or more dopants during the oxidative and/or electrochemical polymerization reactions. The dopants are thereby incorporated directly in the polymer as it is synthesized.

Thus, the electrically conductive polymers, and particularly polyanilines, are conveniently doped with perchlorate ions when perchloric acid or a salt thereof, for example, lithium perchlorate ($LiClO_4$), is used as the electrolyte in the polymerization reaction. In a similar manner, other dopants, for example, fluoroboric acid ($HBF_4$) and salts thereof can be incorporated directly into electrically conducting polymers, including polyaniline, as they are synthesized.

As noted above, the core member 26 is substantially completely surrounded and/or coated with the charge donor material 28. In the case of electrically conductive polymers, for example, polyaniline, the core member 26 may be coated with the electrically conductive polymer by polymerizing a monomer, for example, aniline, in the presence of the core member 26. In this manner, the electrically conductive polymer is deposited directly onto the core member 26.

In accordance with preferred embodiments of the present invention, the core member 26 is evenly and uniformly coated with a film of the electrically conductive polymer in a desired thickness. The thickness of the electrically conductive polymeric film which is coated onto the carbon fibers depends on a variety of factors, including the particular reagents selected, including the monomer(s) and oxidant and/or electrolyte, solvent, concentration of monomer in the polymerization solution, the polymerization reaction time, and the like. Applicant has found that the electrically conductive polymer is preferably coated on the core member 26 in a thickness of about 0.1 micron.

In accordance with further preferred embodiments of the present invention, the current conducting means 18 is electrically interfaced with the ion transporting medium 22 such that charge can be transferred from the current collecting means 12 to the ion transporting medium 22. As represented schematically in FIG. 2, the current conducting means 18 preferably comprises a plurality of current conducting members 24 which extend into, and are integrally engaged with, the ion transporting medium 22.

The ion transporting medium 22 preferably comprises a material which is substantially solid and which can readily accept charged species which are donated by the charge donor material 28. Preferably, the ion transporting medium 22 comprises a material which behaves as an electrolyte. Preferred materials for use as the ion transporting medium 22 include materials which are substantially flowable and/or which readily deform at room temperature, as well as materials having a melting temperature from about room temperature up to about 65° C.

In accordance with preferred embodiments of the present invention, the ion transporting medium 22 comprises a polymeric material, for example, polymeric materials which are substantially solid at room temperature. Examples of polymeric materials which are suitable for use as the ion transporting medium 22 include poly(ethylene oxide), poly(propylene oxide), phosphazine polymers, for example, oligoethyleneoxypolyphosphazine, and isocyanate-crosslinked poly(ethylene oxide). The polymers which are used as the ion transporting medium 22 may be optionally impregnated with one or more of the electrolytes and/or oxidants discussed above in connection with the preparation of the electrically conductive polymers of the present invention. Other polymeric materials, including the solid polymeric materials discussed above, would be suitable for use as the ion transporting medium 22 and would be readily apparent to one of ordinary skill in the art in view of the present disclosure.

It is contemplated also that the ion transporting medium 22 may comprise a mixture of materials which are flowable at room temperature and which may be cured by exposure to an electron beam, ion beam or UV! light. In this connection, the ion transporting medium 22 may comprise, for example, a mixture of 2-propenoic acid esters of ethylene oxide-propylene oxide copolymer triols and 5-acenaphthene which is UV-cured.

In accordance with preferred embodiments of the present invention, the ion transporting medium 22 preferably comprises poly(ethylene oxide). In preferred embodiments, the poly(ethylene oxide) comprises a molecular weight of about 10,000 to about several million.

Other materials suitable for use as the ion transporting medium 22, in addition to those discussed above, will be readily apparent to one of ordinary skill in the art in view of the present disclosure.

In accordance with preferred embodiments of the present invention, the cathode 10 comprises a subassembly composite 30. The subassembly composite 30 preferably comprises the current conducting means 18 which is integrally engaged with the ion transporting medium 22. In preferred embodiments, for example, where the ion transporting medium 22 comprises a polymer, the subassembly composite 30 can be prepared by polymerizing the monomeric precursor to the ion transporting medium 22, for example, ethylene oxide, in the presence of the current conducting means 18. Alternatively, the polymeric ion transporting medium 22 may be heated to a temperature which causes the polymer to melt and/or flow. The current conducting means 18 is then integrally engaged with the softened polymer and the polymer is allowed to cool and harden.

In accordance with preferred embodiments of the present invention, the current conducting means 18 is electrically interfaced with the face 20 of the current collector means 12 by mounting the subassembly composite 30 to the face 20 of the current collector means 12. This may be accomplished using techniques well known to those of ordinary skill in the art. For example, where the ion transporting medium 22 comprises a material which is substantially solid at room temperature, for example, a substantially solid polymer, such as poly-(ethylene oxide), the subassembly composite 30 may be heated to a temperature to cause the ion transporting medium 22 to melt and/or flow. The subassembly composite 30 may then be mounted to the current collector means 12 with the application of pressure. The ion transporting medium 22 of the subassembly composite 30 is allowed to cool and harden to provide the cathode 10.

As noted above, the ion transporting medium 22 may also comprise materials which are substantially flowable and/or deformable at room temperature, for example, compounds which are fluid and/or tacky at room temperature and which may be crosslinked to provide a substantially solid ion transporting medium 22. In this case, the current conducting means 18 may be electrically interfaced with the ion transporting medium 22 and the current collector means 12 by preparing a flowable and/or deformable mixture which comprises the current conducting means 18 and the ion transporting medium 22. This mixture is then "painted", "smeared" or "doctor blade" coated onto the face 20 of the current collector means 12 and crosslinked by exposure to UV light. In this fashion, there is thus provided an integral composite matrix of the conducting members 24 and the ion transporting medium 22.

In accordance with certain aspects of the present invention, it is contemplated that the core member 26 is not required to be in mating relationship with the face 20 of the current collector means 12. Rather, the core member 26 may be substantially completely surrounded with the charge donor material 28. The current conducting members 24 are thereby electrically interfaced with the current connector means 12 via the charge donor material 28.

Figure 4:
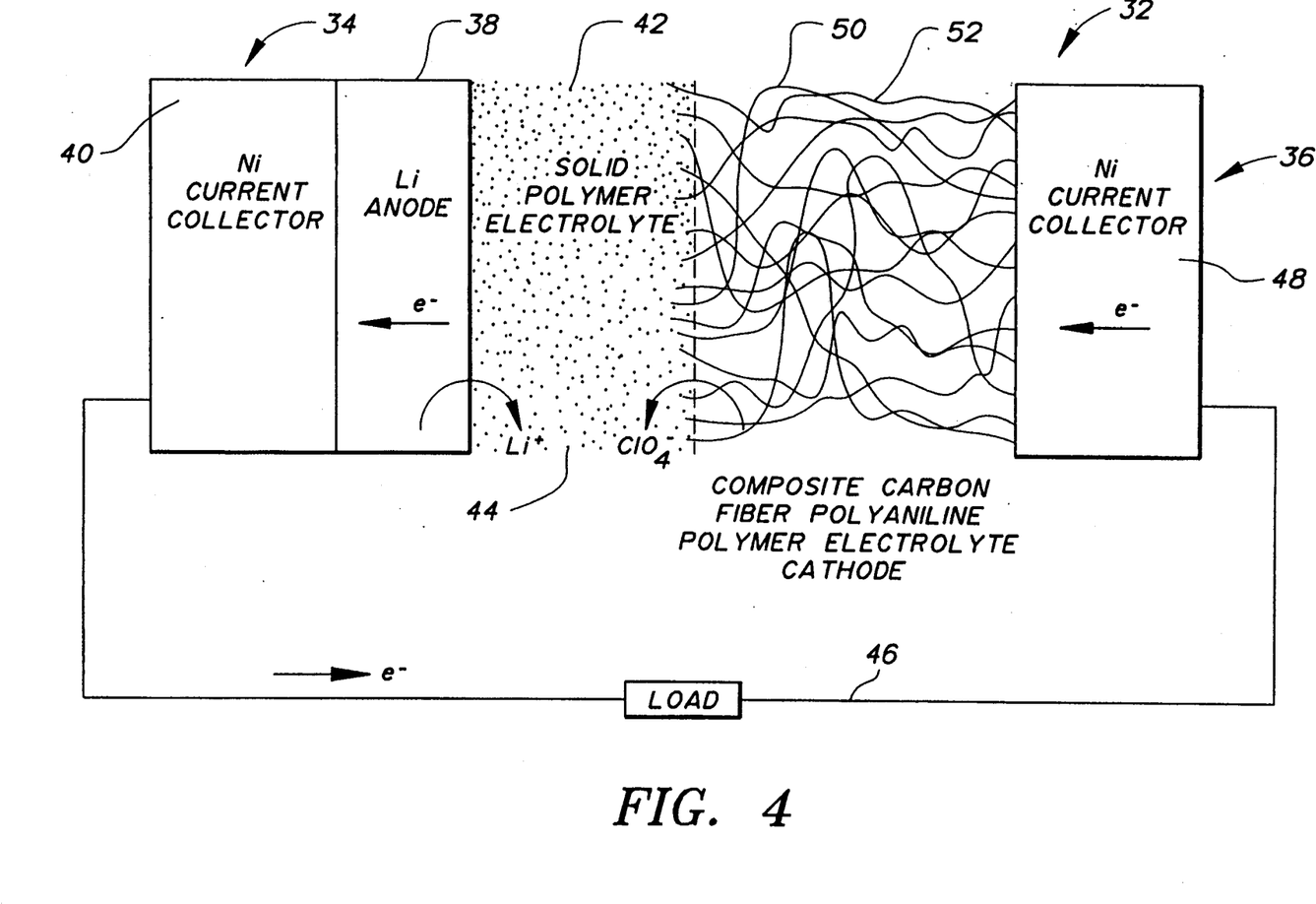
FIG. 4 is a schematic representation of a battery according to one embodiment of the present invention.

With particular reference to FIG. 4, there is represented schematically a battery 32 in accordance with preferred aspects of the present invention. The battery 32 preferably comprises an anode means 34. The anode means 34 discharges a first species of charged particles, for example, negatively charged particles, including electrons, when the battery 32 is loaded The term "loaded" as used herein, refers generally to the closing of the circuit of the battery 32 to electrically interface the anode means 34 with a cathode means 36. The first species of charged particles thereby flow from the anode means 34 to the cathode means 36.

The anode means 34 may comprise any of a number of materials, including electrically conductive polymers similar to those described hereinbefore, as well as graphite, metals which are capable of providing a mono- or divalent cations, such as lithium, sodium, potassium, magnesium, calcium, barium, and zinc and alloys containing one or more of these metals. Preferably, the anode means 34 comprises an anode 38 which is lithium and alloys thereof.

In preferred embodiments of the present invention, the anode means 34 also comprises a current collector means 40. The current collector means 40 may be the same or different from the current collector means 12 described above in accordance with the cathode 10 of the present invention.

In accordance with preferred aspects of the present invention, the anode means 34 comprises a substantially pure lithium anode 38 bonded to a current collector means 40 which comprises a lithium-free metal. The bonding of lithium metal to non-lithium metal is known to those skilled in the art and is described, for example, in U.S. Pat. No. 4,939,050, the teachings of which are incorporated herein by reference.

In accordance with certain aspects of the present invention, the battery 32 comprises charged particle receiving means 42. The charged particle receiving means 42 may be the same or different from the ion transporting medium 22 described hereinbefore in connection with the cathode 10.

Preferably, the charged particle receiving means 42 is substantially similar to the ion transporting medium 22 of the cathode 10, and preferably comprises a material which is substantially flowable at room temperature and which may be cured upon exposure to UV light, as well as materials which have a melting temperature from about room temperature up to about 65° C. More preferably, the charged particle receiving means 42 comprises a substantially solid polymer, for example, poly-(ethylene oxide).

In accordance with preferred embodiments of the present invention, the charged particle receiving means 42 is electrically interfaced to the anode means 34. Preferably, the charged particle receiving means 42 is electrically interfaced to a face 44 of the anode 38. Electrically interfacing the charged particle receiving means 42 with the anode means 34 generally involves techniques well known to those of ordinary skill in the art. For example, the charged particle receiving means 42 may be heated to a temperature to cause the charged particle receiving means 42 to melt and/or flow. In the case where the charged particle receiving means 42 preferably comprises poly(ethylene oxide), the charged particle receiving means 42 is heated to above about 65° C. The anode means 34 is then pressed into the softened polymer and the polymer is allowed to cool and harden.

As noted above, the charged particle receiving means 42 may comprise materials which are substantially flowable at room temperature and which may be cured by exposure to UV light, ion beam or electron beam. In this case, the charged particle receiving means may be smeared, painted, or doctor bladed onto the anode means 34 and subsequently cured.

In preferred embodiments of the present invention, the charged particle receiving means 42 receives a second species of charged particles from the anode means 34. For example, when the anode 38 comprises a lithium anode, the charged particle receiving means 42 may receive the second species of charged particles in the form of lithium cations.

As noted above, the anode means 34 is electrically interfaced with the cathode means 36 when the battery 32 is loaded. The first species of charged particles may then flow from the anode means 34 to the cathode means 36 via the electrical interface means 46. The electrical interface means 46 comprises any suitable material through which charged particles may be transferred from the anode means 34 to the cathode means 36 when the battery 32 is loaded. Examples of electrical interface means which are suitable for use in the battery 32 includes wiring, metal contacts, electrically conductive polymers, and the like.

In accordance with preferred embodiments of the present invention, the cathode means 36 may be the same as, or different from, the cathode 10 discussed hereinbefore. Preferably, the cathode means 36 is substantially similar to the cathode 10, and preferably comprises a current collector means 48 which is electrically interfaced to a current conducting means 50.

The current collector means 48 may be the same as, or different from, the current collector means 12 of the cathode 10. Preferably, the current collector means 48 is substantially similar to the current collector means 12 of the cathode 10, and preferably comprises a material which can readily collect electrical current in the form of charged particles, including transition metal elements, for example, nickel, iron and zinc.

In accordance with preferred embodiments of the present invention, the current conducting means 50 may be the same as, or different from, the current conducting means 18 of the cathode 10. Preferably, the current conducting means 50 is substantially similar to the current conducting means 18 of the cathode 10, and preferably comprises a plurality of current conducting members 52 which are electrically interfaced with the current collector means 48 and the charged particle receiving means 42. As represented schematically in FIG. 4, the current conducting members 52 preferably extend into, and are integrally engaged with, the charged particle receiving means 42.

The current conducting members 52 may be the same as, or different from, the current conducting members 24. Preferably, the current conducting members 52 are substantially similar to the current conducting means 24 of the cathode 10, and preferably comprise a core member substantially completely coated with charge donor material.

When the battery is loaded, it is contemplated that the following processes occur. First species of charged particles, for example, free-flowing electrons, flow from the anode means 34 to the current collector means 48 of the cathode means 36. Second species of charged particles, for example, cations, including lithium cations, are deposited into the charged particle receiving means 42 from the anode 38 of the anode means 34.

As the current collector means 48 receives the first species of charged particles, charge is transferred to the charged particle receiving means 42 via the current conducting means 50. In preferred embodiments, the current conducting means 50 donates a third species of charged particles to the charged particle receiving means 42. The third species of charged particles preferably comprise negatively charged particles, for example, anions, including perchlorate anions.

The present invention may be embodied in other specific forms without departing from the spirit or essential attributes thereof and, accordingly, reference should be made to the appended claims, rather than to the foregoing description, as indicating the scope of the invention.

What is claimed is:

1. A cathode comprising:
   current collector means for collecting charged particles injected into the cathode from an anode; and
   current conducting means electrically interfaced to an ion transporting medium and to the current collector means for transferring charge from the current collector means to the ion transporting medium, wherein the current conducting means comprises a plurality of core members and a charge donor material that donates charge to the ion transporting medium when the charged particles are collected by the collector means, said current collector means comprising nickel or nickel alloy.

2. The cathode of claim 1 wherein said core members comprise fibers.

3. The cathode of claim 2 wherein said fibers comprise carbon fibers.

4. The cathode of claim 3 wherein said fibers comprise porous fibers.

5. The cathode of claim 2 wherein said charge donor material comprises an electrically conductive polymer.

6. The cathode of claim 5 wherein said electrically conductive polymer is selected from the group consisting of polyaniline, polythiophene, polypyrrole, poly(p-phenylene oxide), poly(p-phenylene sulfide) and poly(p-phenylene).

7. The cathode of claim 6 wherein said electrically conductive polymer comprises polyaniline.

8. The cathode of claim 5 wherein said electrically conductive polymer further comprises dopant.

9. The cathode of claim 8 wherein said dopant is selected from the group consisting of tetraalkylammonium salts, lithium salts, silver salts, organic acids and inorganic acids.

10. The cathode of claim 9 wherein said dopant is selected from the group consisting of tetrafluoroborate, hexafluoroarsenate, hexafluorophosphate, perchlorate, fluorosulfonate, hydrogen sulfate, trifluoromethylsulfonate, trifluoroacetate, chloride, bromide, fluoride, iodide, phosphorate and dichromate.

11. The cathode of claim 10 wherein said dopant is selected from the group consisting of dichromate, tetrafluoroborate, perchlorate, chloride, hexafluorophosphate, trifluoromethylsulfonate and hexafluoroarsenate.

12. The cathode of claim 11 wherein said dopant is selected from the group consisting of tetrafluoroborate, dichromate and perchlorate.

13. The cathode of claim 12 wherein said dopant comprises perchlorate.

14. The cathode of claim 5 wherein said ion transporting medium has a melting temperature of about room temperature to about 65° C.

15. The cathode of claim 14 wherein said ion transporting medium comprises an integral matrix of said fibers, electrically conductive polymer and ion transporting medium.

16. The cathode of claim 15 wherein said ion transporting medium comprises a substantially solid polymeric material.

17. The cathode of claim 16 wherein said ion transporting medium comprises poly(ethylene oxide).

18. A battery comprising:
   anode means for discharging a first species of charged particles when the battery is loaded;
   charged particle receiving means electrically interfaced to the anode means for receiving a second species of charged particles from the anode means;
   current collector means electrically interfaced to the charged particle receiving means for receiving the first species of charged particles from the anode means when the battery is loaded;

core member means electrically interfaced to the current collector means and extending into the charged particle receiving means for transferring charge from the current collector means to the charged particle receiving means; and charge donor means electrically interfaced with the core member means for donating a third species of charged particles to the charged particle receiving means when the battery is loaded.

19. The battery of claim 18 wherein said anode means comprises lithium or lithium alloy.

20. A method of manufacturing a cathode to be used in a battery comprising the steps of:

coating a plurality of core members with a charge donating material;

interfacing the coated core members to an ion transporting medium to provide a subassembly composite; and interfacing the subassembly composite to a current collector.

21. The method according to claim 20 comprising coating a plurality of fibers.

22. The method of claim 21 comprising coating a plurality of carbon fibers.

23. The method of claim 22 comprising coating said carbon fibers with an electrically conductive polymer selected from the group consisting of polyaniline, polythiophene, polypyrrole, poly(p-phenylene oxide), poly(p-phenylene sulfide) and poly(p-phenylene).

24. The method of claim 23 comprising coating said carbon fibers with polyaniline.

25. The method of claim 24 comprising interfacing said carbon fibers to said ion transporting medium having a melting temperature of about room temperature to about 65° C.

26. The method of claim 25 comprising interfacing said carbon fibers to said ion transporting medium to provide an integral matrix of said fibers, electrically conductive polymer and ion transporting medium.

27. The method of claim 26 comprising interfacing said carbon fibers with a substantially solid polymeric material.

28. The method of claim 27 comprising interfacing said carbon fibers to poly(ethylene oxide).

29. The method of claim 28 comprising polymerizing ethylene oxide in the presence of said carbon fibers.

30. The method of claim 20 comprising interfacing said subassembly composite to nickel or nickel alloy.

* * * * *